May 20, 1958 N. T. BERKELMANS 2,835,368

STENOGRAPHIC MACHINE

Filed Oct. 31, 1955

INVENTOR.
Nicholas T. Berkelmans
BY
B. J. Garvey
ATTY.

United States Patent Office 2,835,368

Patented May 20, 1958

2,835,368

STENOGRAPHIC MACHINE

Nicholas T. Berkelmans, Santiago, Chile

Application October 31, 1955, Serial No. 543,813

10 Claims. (Cl. 197—9)

This invention relates to improvements in stenographic machines of the type designed to type words or syllables in vertical alignment.

Various stenographic machines have been devised, having for their purpose, the reproduction of words in legible form, illustrative of which machines are Patents Numbers 2,607,464 granted August 19, 1952; 2,154,577 granted April 18, 1939 and 1,899,232, granted February 28, 1933. However, due, inter alia, to their large number of keys and inconvenient locations, it requires a long time to learn to type at a rapid rate. These machines additionally operate on a phonetic re-spelling basis, requiring a mental process which also retards learning.

It is the principal object of the present invention to provide a stenographic typing machine having a single case keyboard employing a minimum number of keys and composed of multiple blocks of keys for operating a set of types, the keys being operable singly or in multiple to record a facsimile indicia of the keys operated on a composite of two or more simultaneously operated keys in horizontally arranged syllables.

Other objects are to provide a stenographic typing machine which operates on a syllable basis and is broadly orthographical; to provide a machine equally adaptable for all foreign languages employing Latin characters; to provide a machine as described, the particular key location being such that no lateral movement of the hands or fingers is required; to reduce the number of keys comprising the keyboard to twenty, yet locating the keys, to permit the more frequently used keys to be in convenient accessability to the more agile fingers of the operator; to provide a single case keyboard which is divided into several blocks of keys, the keys of each block being related and certain keys of one block being positioned and adapted for easy operation by the thumbs; and to provide a non-shift keyboard capable of obtaining twice the number of letters singly available and more letters than available with the more cumbersome (and technically complicated) shift keyboards of the same number of keys.

Other objects of the invention will be manifest from the following description of the present preferred form of the invention, taken in connection with the accompanying drawings, wherein.

Figures 1, 2, 3, 4, 5, 6:
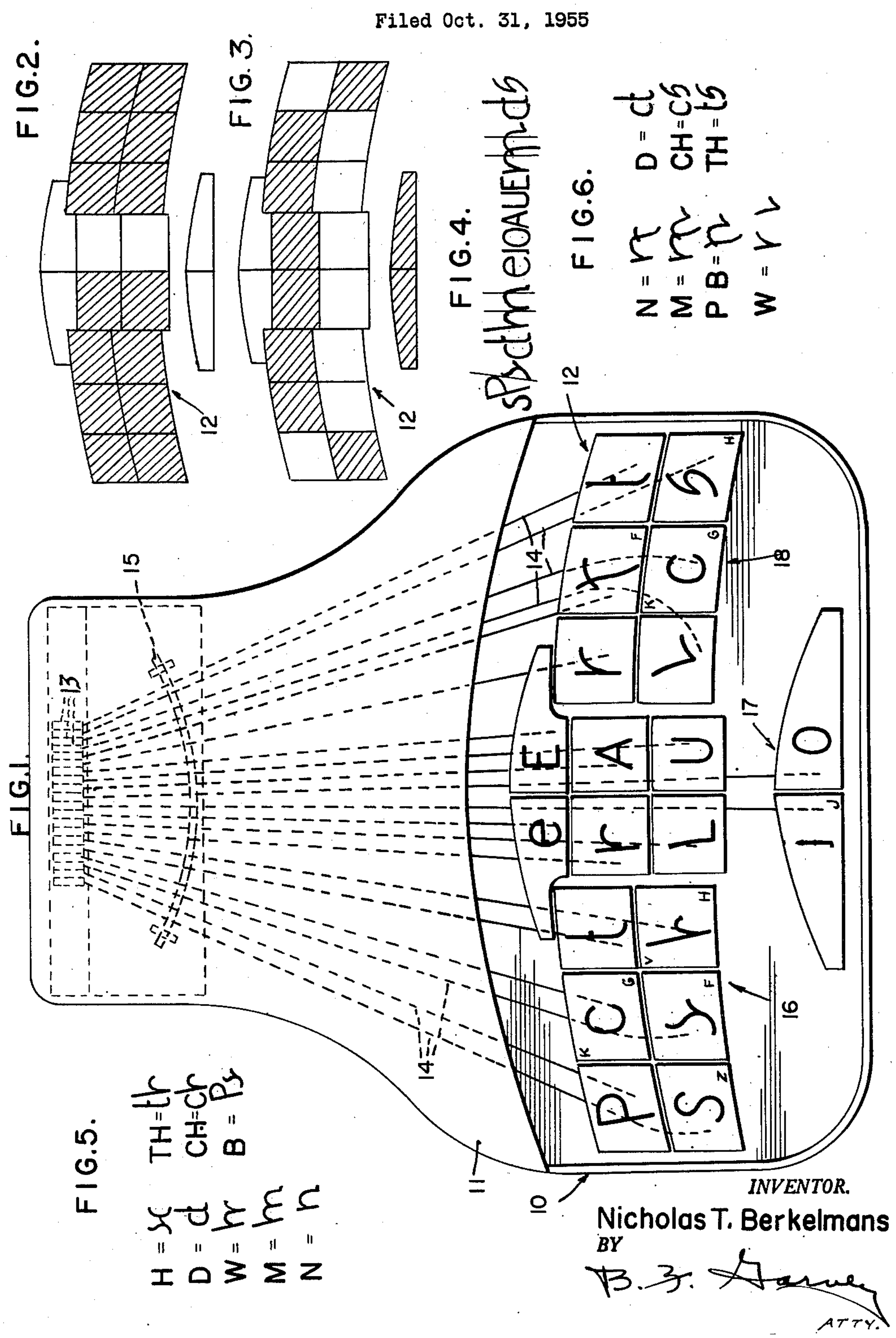
Fig. 1 is a top plan view of a stenographic machine constructed in accordance with the present invention.
Fig. 2 is a schematic view of the keyboard of the present stenographic machine, certain keys thereof being hatched to illustrate the asymmetry of the keyboard.
Fig. 3 is a similar view, certain keys of the keyboard being hatched to illustrate the 'home row'.
Fig. 4 illustrates the sequence of letters made by the present invention.
Fig. 5 illustrates the combination letters made by the initial consonant block forming a part of the present invention.
Fig. 6 illustrates the combination letters made by the final consonant block forming a part of the present invention.

In view of the fact that the syllable constitutes the most natural and least complex orthographical unit, it has been selected as the basic unit for the present invention in order to produce an easier simultaneous striking of the keys, better rhythm with less physical strain, greater speed and fewer mistakes. By writing exclusively on a syllabic basis, it has been possible to provide a single case keyboard in which the number of keys has been reduced to twenty. The total number of characters obtainable with this machine has been increased by assigning to the more complex consonant characters (which in accordance with their complexity of sound or shape, have less relative frequency) two or three keys for their reproduction, these consonants being broken down into consonants of less complexity of sound or shape (and therefore of higher relative frequency). This procedure is based on universal phonetic laws of letter behavior which have established that consonants of greater magnitude of complexity have a lower relative frequency than the consonants of a smaller magnitude of complexity. By applying these universal linguistical laws, the present keyboard has been arranged so that it is rational in every respect, viz. the least suitable fingers of the hands operate letters of relatively low frequency, and if the frequency is higher or they have to reproduce combined characters, they are in a natural position; the most suitable fingers either operate letters of relatively high frequency or the more complex consonants; the least suitable fingers (thumbs) have the easiest and most natural positions; the syllables of relatively high frequency involve the use of the most agile fingers in the easiest positions; the division of activities is equal between the two hands; the best suited fingers (the index fingers and middle fingers have the greatest participation in the overall finger manipulations, and the complex characters have been chosen in such a way that their separate elements in their single or less complex use, do not occur in their fixed sequence as separate consonant groups, since they constitute phonetical inconsistencies.

Referring now in greater detail to Fig. 1 of the drawing, the machine of the present invention comprises a frame or casing 10 including a cover 11 and a keyboard 12. Adapted to engage a paper roll carried by frame 10 are a plurality of types 13 supported by type bars 14. A type bar rest is indicated at 15. Types 13 are selectively raised to contact the paper roll by operation of a key or keys comprising keyboard 12 which directly actuate type bars 14. Conventional spring means (not shown) are provided for returning the types to their rest position upon release of the particular key or keys. Any conventional escape mechanism may be employed for moving the paper through the machine a predetermined amount, after each simultaneous depression of a key or keys. It is to be understood that the paper roll may be fed aft from the machine, after the fashion of a typewriter, or fed laterally therefrom after the fashion of a ticker tape machine.

Keyboard 12 of the present invention is divided into three blocks of indicia designated 16, 17 and 18. Block 16 comprises six keys making up the initial consonants of the syllable to be reproduced and is operated by the little finger, ring finger and middle finger of the left hand. Each finger is adapted to operate two keys, movement thereof being strictly fore and aft.

Central or vowel block 17 of the keyboard comprises six keys in two columns of three each, operated by both index fingers and two spaced keys, the "i" and the "o" key, aligned with the two columns and operated by the thumbs. Up to the present time, with machines of this type, it has been necessary to assign four or more keys to the thumbs. This is impractical since the thumbs must assume different positions and are drawn into the operational activities of the hand too much. The operation of the thumb keys is consequently slow, since the thumbs lack the orientation and pointing capacity that the other fingers have. This problem is eliminated with the keyboard of the present invention by assigning to the thumbs only one key each, so that no shifting of the thumbs is necessary. Further facility is provided by shaping the thumb keys to form a split bar, similar to the space bar of the typewriter.

Linguistical investigations have shown that with the syllable as a basis of transcription, there is a marked tendency towards left asymmetry, i. e. the left hand is more active than the right. This is due to the fact that there are more "open" than "closed" syllables and that there are more "closed" syllables with left stress than with right stress (more initial than final consonants). In a symmetrical keyboard, this would draw the left hand too much into the operational activities, the main disturbance factor of symmetry being the liquid and nasal consonants. In order to mitigate this undesirable factor, the keyboard of the present invention has been arranged in asymmetrical order by placing the liquid and nasal consonants in "central or vowel block" 17. These keys are operated by the index finger of the left hand. In addition to this arrangement, the vowel keys in this block are so positioned, that the majority thereof are operated by the right index finger. Consequently an approximate equilibrium is attained. This asymmetry is illustrated by the schematic view of the keyboard shown in Fig. 2, in which the keys which are hatched comprise the initial and final consonants thereof.

It should also be noted in connection with vowel block 17 that the vowel of highest frequency "e," is typed by the right or left index finger, by virtue of a double key in the shape of a split bar. As is clear from a consideration of the letter sequence of the present keyboard, illustrated in Fig. 4, if the "e" key is depressed by the left index finger, that letter is typed at the beginning of the vowel sequence, and if depressed by the right index finger, it is typed at the end of the vowel sequence. The most important vowel combinations can thereby be made to produce an orthographical spelling of words in all languages employing Latin characters.

Final consonant block 18 is similar in arrangement to initial consonant block 16 and comprises six keys adapted to be depressed by the little finger, ring finger, and middle finger of the right hand. The keys are arranged in three columns of two keys each so that each finger operates two keys by fore and aft movement of the fingers.

Referring now to Fig. 3, it will be seen that the keys which are hatched illustrate the "home row" position of the fingers on keyboard 12. The little fingers, middle fingers and index fingers are adapted to operate two keys each, the index fingers, which are the most agile, operate three keys each, and the thumbs operate only one key each. By this arrangement no lateral shifting of the hands or fingers is necessary at any time. Furthermore, it will be noted that the keyboard is so shaped that the "home row" keys follow the contour of the fingers in their natural position so that as a result, there is facility of operation and the elimination of all unnecessary finger or hand motion.

It will be seen from a consideration of Fig. 1 of the drawing, that some of the indicia which are typed by the present machine, are somewhat modified to indicate a dual function and/or use with other indicia to form complex letters. For instance, in block 16, one key is used to indicate an "S" or "Z" because of the similarity in sound of these letters. The same is true of the "C" key which, because of its similarity in sound, is used for the letter "K" and because of its similarity in appearance and derivation, is used for the letter "G." The indicia used for the letters "Y" and "F" is suggestive in appearance to both of these letters. Likewise, the indicia used for "T" and "H" is also suggestive of these letters' appearances.

In vowel block 17 there is only one indicia which serves a dual function, that indicia being suggestive in appearance to both the letters "i" and "j." The other indicia of the vowel block form Latin characters with the possible exception of the indicia for the letter "r" which, however, resembles this letter very closely.

There is shown in Fig. 5 the speech symbols which may be typed by combining the indicia of initial consonant block 16 and the liquid and nasal consonants of vowel block 17. With the exception of the letter "m" which requires a combination of three separate indicia, these speech symbols are formed by the combination of two indicia.

The indicia on the keys comprising final consonant block 18 are in part, similar to the keys of blocks 16 and 17. For example, the "r" of block 18 is similar in appearance to that of block 17 and the "t" is similar to the "t" of block 16. Also the "c" key of block 18 is used for the letters "k" and "g" as in block 16 and the "y" key, somewhat different in appearance from that of block 16, is used for the letter "f" because of its resemblance thereto. Block 18 is also provided with a key which represents both letters "s" and "h," the indicia of the key being such that it suggests both of these letters, with the understanding that it is only used as "H" in combination with "C" or "T," just as the "V" is only used as "H" in combination with initial "C" or "T." Finally, block 18 includes a key having indicia thereon which closely resembles the letter "L."

In Fig. 6, there is illustrated the speech symbols formed with final consonant block 18 by combining the indicia typed by these keys. Just as with the speech symbols of blocks 16 and 17, the letter "m" is formed by the indicia of three keys whereas the remainder are formed by the indicia of only two keys.

With the machine of the present invention, it has been found that the spelling of words is at least 92% correct for any language in which Latin characters are used. Also, 99% of one-syllable words may be typed in one stroke.

A sample of subject matter typed by this machine is set out on the following page. Since the syllables of each word are typed in their entirety, in directly legible indicia, anyone of reading age or over, can read the typed matter. It is believed that this will be clear from the following illustrations showing indicia on rolls of tape fed aft of the machine and also specimens of lateral-fed tape of appropriate width.

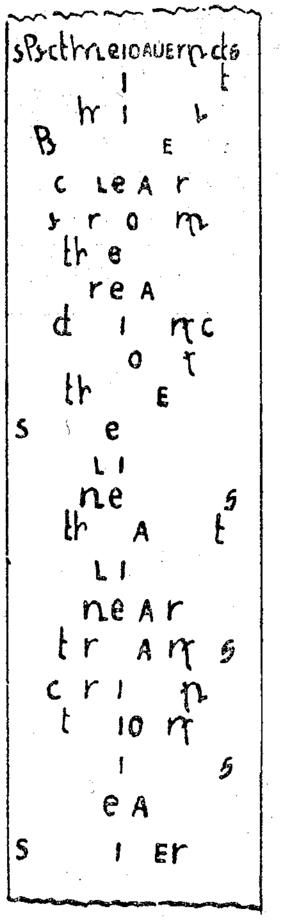

the little finger, ring finger and middle finger of each hand, and a central block of keys for vowels and liquid consonants arranged in two columns selectively operated by the index fingers and thumbs, thereby effecting operation of the keys without lateral shifting of the hands.

2. A keyboard for stenographic machines as set out in claim 1 with the addition of a set of types operatively connected to said keys in a predetermined sequence and bearing characters corresponding to the keys, two keys of the vowel group of the central block of keys being for the character "E," the types for these two keys being at the beginning and end respectively of the sequence of vowels imprinted by said set of types.

3. A keyboard for stenographic machines as set out in claim 2 wherein the types for the liquid consonants "L" and "R" of the central block are at the left of the vowel group.

4. A keyboard as set out in claim 1 wherein the blocks of keys for initial and final consonants each embody six keys and the central block of keys for vowels and liquid consonants embodies eight keys.

5. A keyboard for stenographic machines including a single case keyboard consisting of a block of selectively operable keys for initial consonants, arranged in three columns, a block of selectively operable keys for vowels and liquid consonants, arranged in two columns, and a block of selectively operable keys for final consonants, arranged in three columns, thereby effecting operation of the keys without lateral shifting of the hands.

6. A machine for recording indicia including a single case keyboard consisting of a block of selectively operable keys bearing indicia, for initial consonants, arranged in three columns, a block of selectively operable keys bearing indicia, for vowels and liquid consonants, arranged in two columns, a block of selectively operable keys bearing indicia, for final consonants, arranged in three

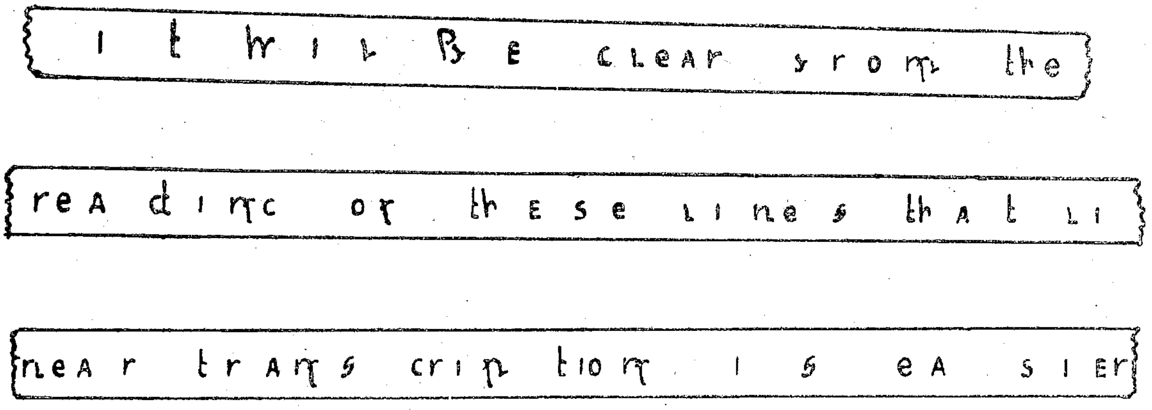

The simplicity of the present machine enables a novice to operate the same, after an explanation of the keyboard and the combinations illustrated in Figs. 5 and 6, thereby obviating the necessity of any formal instruction course.

It is within the contemplation of the present invention to provide a machine with a keyboard of reduced size, to facilitate use of this machine by young children.

While I have herein shown and described a preferred embodiment of my invention, it is nevertheless to be understood that various changes may be made therein, without departing from the spirit and scope of the appended claims.

What I claim is:

1. A keyboard for stenographic machines comprising blocks of keys for initial and final consonants, each arranged in three columns of keys selectively operated by columns, and a set of types operatively connected to said keys, the types bearing indicia which correspond to the indicia of the keys, the keys being operable singly or in multiple, either in the same or different blocks to record a facsimile indicia of the key operated or a composite of two or more simultaneously operated keys.

7. A single case keyboard for stenographic machines consisting of a block of selectively operable keys for initial consonants, arranged in three columns, a block of selectively operable keys for vowels and liquid consonants, arranged in two columns, and a block of selectively operable keys for final consonants, arranged in three columns, said keys being operable singly or in multiple in the same or different blocks for recording a facsimile of the key operated or for recording indicia resulting from the simultaneous operation of two or more keys.

8. A keyboard for stenographic machines, as set out in claim 5, wherein the block of keys for vowels and liquid consonants embodies a single pair of thumb-operated keys.

9. A machine for recording indicia, as set out in claim 6, wherein the indicia of the types are strategically positioned to form the four consonants "S," "P," "d" and "m," when all of the initial and liquid consonants keys are depressed in a predetermined maner, either singly or in multiple, the indicia forming the four consonants designating, either singly or in multiple, at least sixteen letters of the alphabet.

10. A machine for recording indicia, as set out in claim 9, wherein the depression of the final consonant keys in a predetermined manner, either singly or in multiple, forms the three consonants "m," "d" and "s," the indicia comprising the three consonants designating, either singly or in multiple, at least thirteen letters of the alphabet.

References Cited in the file of this patent

UNITED STATES PATENTS

| | | |
|---|---|---|
| 1,899,232 | Den Outer | Feb. 28, 1933 |
| 2,154,577 | Den Outer | Apr. 18, 1939 |

FOREIGN PATENTS

| | | |
|---|---|---|
| 396,968 | France | Feb. 10, 1909 |